(No Model.)

H. W. SOUTHWORTH.
WHEEL.

No. 578,472. Patented Mar. 9, 1897.

WITNESSES

INVENTOR
Horatio W. Southworth
BY
ATTORNEY

UNITED STATES PATENT OFFICE.

HORATIO W. SOUTHWORTH, OF NEW YORK, N. Y.

WHEEL.

SPECIFICATION forming part of Letters Patent No. 578,472, dated March 9, 1897.

Application filed May 29, 1896. Serial No. 593,597. (No model.)

*To all whom it may concern:*

Be it known that I, HORATIO W. SOUTH-WORTH, a citizen of the United States, and a resident of New York, in the county of New York and State of New York, have invented a certain new and useful Wheel, of which the following is a specification.

My invention relates to an improvement in wheels, and particularly to that class of wheels designed to relieve the axle from the shock imparted to the tire.

The most common form of such wheel now in use is that provided with rubber tires, either solid, tubular, or pneumatic. The degree of resiliency in the solid tire is slight, that in the tubular, or, as it is popularly termed, the "cushion," tire is a little greater, while the pneumatic tire affords the greatest amount of resiliency of any of these. This, however, is subject to severe drawbacks, the greatest of which is the liability to collapse by puncture or otherwise, when it and the wheel also are rendered useless until repairs can be made. This unreliability of the pneumatic tire makes it imperative that a suitable substitute be supplied. Such a substitute is provided by my invention, which consists in a wheel provided with spring connections between its spokes and the rim.

The invention further consists in the construction, combination, and formation of parts, as hereinafter fully described, and set forth in the claims.

Figure 1:
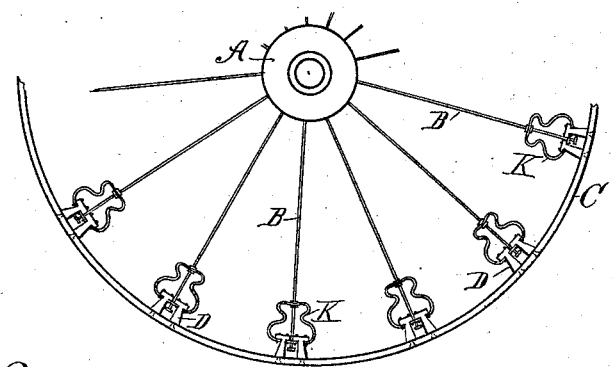
Figure 2:
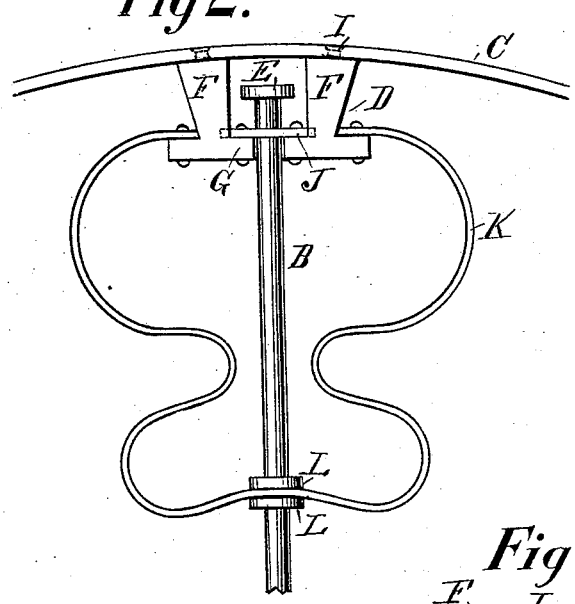
Figure 3:
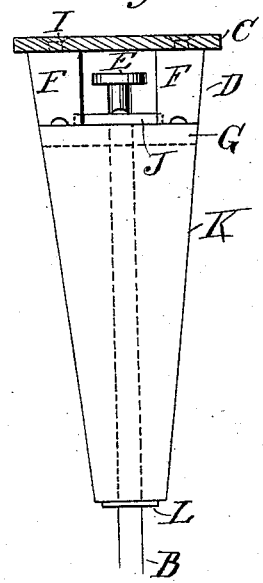
Figure 4:
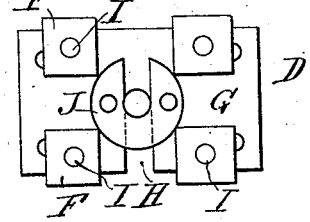

In the accompanying drawings, which form a part of this specification, Figure 1 represents a portion of a wheel embodying my invention. Fig. 2 is a side view of one spoke and the spring connection between it and the rim. Fig. 3 is an edge view of the same. Fig. 4 is a plan view of one of the spoke-guides.

In the drawings, A indicates the hub of the wheel, in which are firmly secured the spokes B in any suitable manner, as by rivet, wedge, or screw connection, the latter way being adopted when it is desired to render the spokes longitudinally adjustable.

C indicates the rim of the wheel. It is illustrated as consisting simply of a band of steel or iron. The rim may, however, be of any desired construction and consist of a felly of wood or metal of any desired cross-section, provided with a tire of any desired kind or form. The rim may also be made resilient, though I prefer to make it rigid, so that it will at all times maintain a circular form.

The spokes are connected to the rim in a manner to move radially with respect thereto. For this purpose they are made to pass through suitable guides secured to the rim. One form of such guide is illustrated and consists of a block D, preferably of malleable metal, provided with a central opening to receive the end of the spoke, which is provided with a suitable head E. This opening for the head may be provided in several ways, as, for instance, by the posts F, arising from a plate G, in the side of which is left an opening H to allow for the lateral insertion and removal of the spokes. These guides are secured to the rim preferably by means of studs I, formed on the posts F and riveted in holes in the rim.

To secure the spokes in the opening H of the guides, open rings, such as J, may be used and secured to the plate G by rivets, as shown, or otherwise, as desired. In the illustration the ring J is shown of such a diameter as to be retained by the posts F against easy displacement from the guide. To remove a spoke, however, it would be only necessary to loosen the ring from the plate and rotate it until the split therein came into alinement with the opening H in the plate, the operation being reversed in inserting a spoke.

The spring which I insert between the spoke and the rim consists, preferably, of a double-gooseneck plate-spring K, through a perforation at the middle of which the spoke is passed and which is secured to the spoke at that point in any desired manner, as by suitable projections or collars, as L, formed upon or attached to the spoke. This attachment to the spoke is made at such a distance from the outer end thereof as to provide the necessary resiliency, and, if desired, the resiliency of the spring may be regulated by making the collars L adjustable upon the spoke.

The ends of the springs K are connected to the rim either directly or through the guide-blocks, as by riveting them to the plate G, as shown. These springs are preferably made wide at their ends, so as to give a lateral support to the rim and spoke.

In use any jar or shock imparted to the rim of my wheel will be taken up by the springs K and prevented from being transmitted to the hub and axle. This, it will be observed, is provided for by the rim having the opportunity of shifting its center from coincidence with that of the hub when the wheel strikes a stone or other obstacle upon the road, the springs at the lower side of the wheel being compressed and those at the upper being distended.

Many changes in detail other than those shown and described may be made without departing from my invention. The guides may be closed at their sides and secured to the springs and rim by screws or other means than rivets, though rivets insure against loosening and loss of parts. The form and mode of insertion of the springs between the spoke and rim may also be changed, though the form shown allows of more readily cleaning the parts than most other forms that might be adopted. The spiral or elliptical springs might obviously be employed, but they would not provide so firm a connection between the spokes and the rim and would be more difficult to keep clean.

What I claim as my invention is—

1. The combination with the rim of a wheel, of spokes having a sliding connection therewith and laterally removable therefrom, and a spring connection between the spokes and the rim, as and for the purpose set forth.

2. In a wheel, the combination with the rim, of spoke-guides connected thereto and provided with lateral openings for the removal of the spokes, the spokes suitably secured to the hub and fitted to slide in said guides, and springs attached at their ends respectively to the spokes and to the rim in a manner to provide a resilient connection between them.

3. In a wheel, the combination with the rim, of spoke-guides secured thereto and each provided with a lateral opening to receive the spoke, a split ring fitted to the spoke and secured to the guide for retaining the spoke in place, and a spring connected to the spoke and to the guide for the purpose set forth.

4. The combination with the rim provided with the spoke-guides secured thereto substantially as shown and described, headed spokes removably secured in said guides, and a double-gooseneck spring secured at its middle to the spoke by suitable collars or projections and at its ends to the sides of the guides.

Signed at New York, in the county of New York and State of New York, this 28th day of May, A. D. 1896.

HORATIO W. SOUTHWORTH.

Witnesses:
WM. H. CAPEL,
D. H. DECKER.